3,172,732
ANALYTICAL METHOD AND APPARATUS
William Grant Hines, Willowdale, Ontario, and Ramon
Leonard Addinall, Stoney Creek, Ontario, Canada,
assignors to The Steel Company of Canada, Limited,
Hamilton, Ontario, Canada, a company of Canada
Filed Mar. 29, 1962, Ser. No. 183,568
7 Claims. (Cl. 23—230)

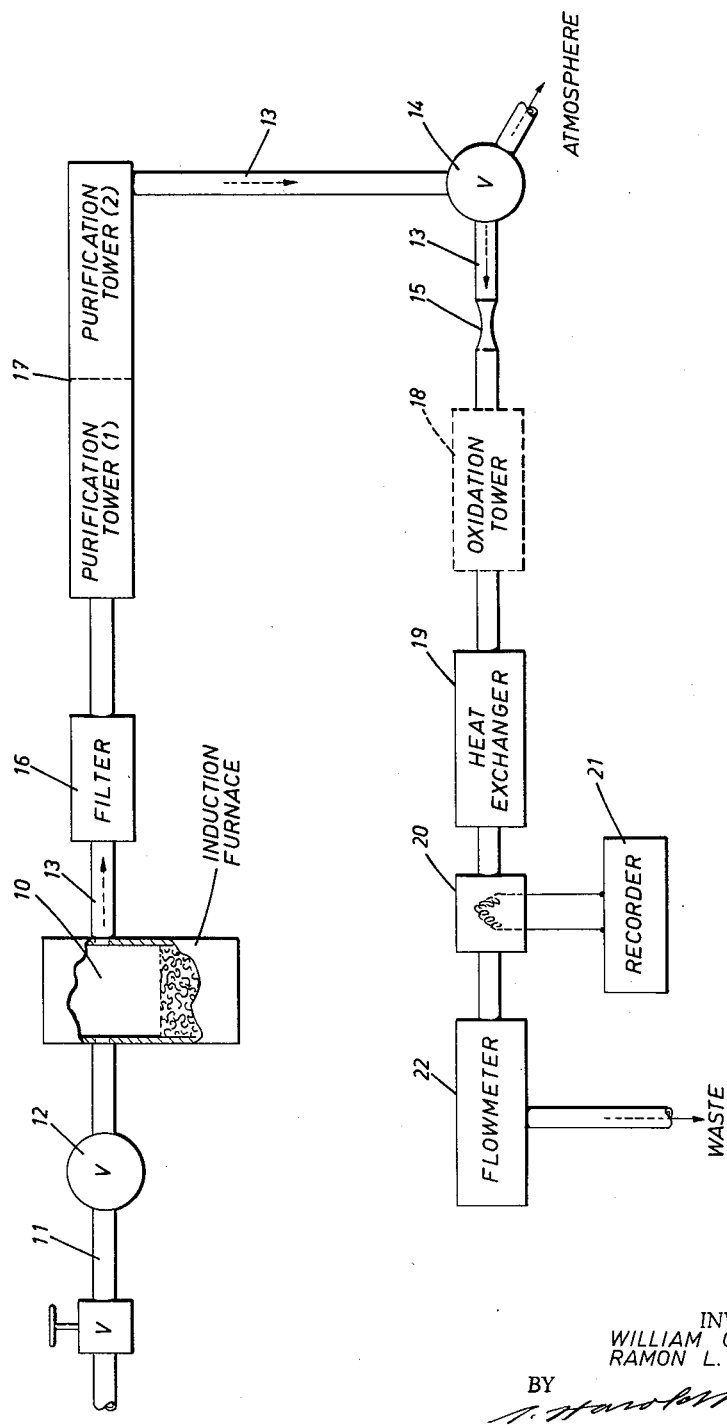

This invention relates to a method and apparatus for the determination of the amount of an element which is present with at least one other element in a substance and which is capable of forming a volatile or gaseous oxide. The invention is particularly directed to providing a method and apparatus for rapidly measuring relatively small amounts of carbon and sulphur which are present in ferrous and non-ferrous metals and alloys thereof.

The invention is described in detail hereinafter as applied to the measurement of the amount of carbon in steel. It will be understood that the principles involved can be employed for detecting and measuring the amount of other elements which are contained in the same or different materials provided such element or elements are capable of forming volatile or gaseous oxides.

Methods and apparatus are well known and are widely used for rapidly determining the carbon and sulphur contents of iron, steel and alloys thereof. The principles on which such methods are based may depend on the influence of the sulphur or the carbon content on some physical property such as magnetism or electrical property of a sample under test compared with a standard sample whose properties are known. The determination of carbon and sulphur contents by comparison of physical propties of a sample under test with a standardized sample has the disadvantage that physical properties of the sample are affected by alloying elements present in the sample and by the methods of casting and cooling the test pieces. The analysis can be relied upon only if all other factors entering into the comparison are maintained constant. Also, such methods are limited to a determination of elements dissolved in the matrix. Thus, for example, the carbon contents of iron and steel in excess of about 1.5% cannot be measured accurately.

Methods for the determination of the carbon and sulphur contents of iron and steel which involve weighing require extremely sensitive balances which are affected by vibration, temperature and fumes. The analyses, therefore, must be conducted in laboratories which are shielded from vibration, tilting and fumes, and, usually, are remote from the furnaces where the data is required. Therefore, there are time losses in delivering the sample to the laboratory, making the required analyses, and returning the data to the operator of the furnace which tend to cause delays in the operation of the furnace and may adversely affect desired properties of the metal or metal alloy being produced.

We have discovered a method, and an apparatus for conducting the method, for making a rapid and accurate determination of the amount of an element which is present in a substance under analysis provided the element is capable of combining with oxygen to produce a volatile or gaseous oxide. The method has the important advantage that it produces very accurate results very quickly and the apparatus required can be located at a point adjacent to that where the data is required and does not require to be protected from vibration or fumes.

The method of the present invention comprises the steps of reacting, in a reaction zone, solid particles of a representative sample of known weight which contains at least one element in amount to be determined with oxygen at a temperature at which said element combines with oxygen to form a volatile or gaseous oxide, maintaining a constant pressure of oxygen above atmospheric pressure in said reaction zone, withdrawing a stream of oxygen and contained volatile or gaseous element oxide from the reaction zone, reducing the pressure of said gas stream to about atmospheric pressure; monitoring the changes in thermal conductivity of said gas stream during the flow thereof; maintaining a constant rate of flow of gas stream past the monitoring step; and continuing said oxidation and monitoring steps until said element has been removed from said sample and carried, as a volatile or gaseous oxide, past the monitoring step.

The apparatus of this invention for determining the amount of at least one element which is present in a substance and which is capable of forming a volatile or gaseous oxide comprises a heatable container adapted to receive a sample of the substance; means for supplying oxygen to said container; means for heating said sample while in said container to a temperature at which said element combines with oxygen to form a volatile or gaseous oxide; means for maintaining a constant pressure of oxygen above atmospheric pressure in said container; conduit means connected to said container and to means for monitoring the changes in the thermal conductivity of said gas stream; means in said conduit for reducing the pressure of the gas stream flowing from said container; means for maintaining a constant rate of flow of gas stream past said monitoring means; and means connected to said thermal conductivity monitoring means for accumulating a signal produced by variations in the thermal conductivity of the flowing stream of gas.

An understanding of the method and apparatus which forms the subject matter of this invention can be obtained from the following description, reference being made to the accompanying drawing which illustrates schematically a preferred embodiment of the invention.

Like reference characters refer to like parts throughout the description and drawing.

Referring to the drawing, the numeral 10 indicates a conventional sample furnace of the type which is capable of heating a sample to an elevated temperature at which combustion of the sample will occur. In the analysis of iron and steel samples, for example, we prefer to use an induction furnace which is capable of heating a sample to temperatures of the order of from 1350° to 1700° C.

An inlet conduit 11 is connected to the furnace through which oxygen is supplied and to a source of oxygen free or substantially free from impurities. A pressure regulating device 12, such as a diaphragm type valve, is provided in the conduit 11 to maintain a constant oxygen pressure in the furnace 10 regardless of the demand for oxygen in the furnace.

An outlet conduit 13 also is connected to the furnace and extends to the thermistor 20 which is adapted to translate the thermal conductivity of the gas stream flowing through the conduit 13 to electrical impulses.

A gas filter 16 preferably is inserted in the conduit 13 adjacent to the furnace 10. This filter is of a conventional type capable of separating solid particles, such as dust, from a flowing gas stream. It is preferred to pass the gas stream through a filter thus to prevent the accumulation of solid particles on the detecting element of the thermistor.

If the substance subjected to analysis contains foreign elements other than that which is to be determined by a specific analysis and which are capable of being converted to volatile or gaseous oxides in the heating furnace, it is preferred to provide apparatus 17 in the assembly which will separate such volatile or gaseous oxides from the gas stream prior to the thermistor. Such devices for the absorption of specific volatile oxides from a gas stream are well known and widely used and it is not necessary to describe them in detail herein. For example, sulphur dioxide can be separated from a gas stream by flowing the stream through a bed of manganese dioxide pellets.

A valve 14 is provided in the conduit 13 between the furnace 10 and the thermistor 20, preferably after the absorption apparatus 17. This valve 14 preferably is a three-way valve adapted to stop the flow of gas through the conduit, to discharge the gas to the atmosphere, or to permit the flow of gas to the thermistor.

A gas flow controlling device 15 is provided in the conduit 13, preferably between the valve 14 and the thermistor 20. As the conduit 13 usually is of relatively small diameter, a glass or ceramic capillary tube can be inserted into the conduit and used to control the rate of flow of gas to the thermistor.

The gas stream flowing through the condiut 13 also can be passed through an oxidation step 18 in which the gas is reacted with oxygen to ensure that the volatile oxide present in the gas is in its highest state of oxidation. For example, in the determination of the carbon content of iron or steel, the carbon should be in the form of carbon dioxide. If the oxidation step is included in the assembly, it can be in the form of a bed of catalyzed cupric oxide particles heated to a temperature of about 660° F.

The gas stream leaving the furnace 10 usually is at a relatively high temperature. However, it cools rapidly as it flows towards the thermistor. A characteristic of the monitoring apparatus, described in detail hereinafter, is that it is calibrated for a zero reading when a stream of oxygen at a predetermined temperature and predetermined flow rate and which contains no volatile or gaseous oxide contacts the filament of the thermistor. Thus, the gas stream flowing from the furnace 10 is passed through a heat exchanger 19 in which the gas is heated or cooled, by conventional heating or cooling elements, as required, to bring its temperature to that for which the monitoring apparatus is calibrated.

The thermal conductivity sensitive device 20, identified herein as a thermistor, is a small filament of semi-conductive material, such as a ceramic, the electrical resistance of which has a very high temperature coefficient. Consequently, resistance measurements, or voltage or current changes produced by variations in thermal conductivity, can be used to determine very slight changes in temperature which occur when the gas surrounding it changes in thermal conductivity. The filament preferably is enclosed in a layer of protective material, such as a thin layer of glass, which protects it from the oxidizing effects of the flowing stream of oxygen gas. Thermal conductivity measuring devices of the type used in this process can be of any type normally used with gas chromatographic equipment and are available on the market as a unit.

An integrating-recording device 21, connected to the thermistor, receives, amplifies and integrates the signal received from the thermistor. A suitable type of instrument is that in which the amplified impulses drive a drum which is calibrated to read directly the percent element oxide of interest which is present in the gas stream and accumulate the impulses during the flow of the entire volume of gas derived from the oxidation of the sample in the heating furnace. There are many types of instruments which are available for receiving and collecting the total number of impulses received during a specific analysis.

The gas stream, after passing the filament of the thermal conductivity measuring device, can be discharged to the atmosphere.

The operation of the method is relatively simple. Oxygen is fed into the furnace and the valve 14 is positioned to discharge the gas to the atmosphere for a short period to ensure that the furnace, filter and absorption towers contain only the oxygen gas. The valve 14 is then re-positioned to direct the gas stream through the conduit 13 to the thermistor 20. An accurately weighed sample in the form of granules, chips, drillings, pins or the like is placed in the furnace wherein the elements capable of forming oxides, such as iron, carbon, sulphur, are oxidized. The induction coils of the furnace are then energized to heat the sample to a temperature at which combustion takes place. The oxides of the elements which are volatile or gaseous at the combustion temperature pass out of the furnace through the conduit 13, through the filter, pass the filament of the thermistor 20 and are discharged, usually to the atmosphere. It is essential, of course, that the gas stream contacting the filament of the thermal conductivity measuring device is at a substantially constant temperature and flow rate for which the instrument is calibrated.

As a specific embodiment of the invention, one-gram samples of steel which contained known amounts of carbon were heated to combustion temperature and oxidized in the heating furnace. The pressure of the oxygen introduced into the furnace through the conduit 11 was maintained substantially constant at 25 inches of water, about 1 pound per square inch above atmospheric pressure, throughout the heating-oxidation step. In each test, the iron content of the steel was oxidized to ferric oxide and the carbon content was oxidized to carbon dioxide. Carbon dioxide was carried in the exit gases through the conduit 13 and ancillary apparatus to the pressure reducing device 15 whereat the pressure was reduced to atmospheric pressure and through a heat exchanger wherein the temperature was brought to 50° C., and then through the thermistor in contact with the filament. The operation of the apparatus was automatically controlled after placing the sample in the furnace. The actual time required for making an analysis was only about a minute but to ensure accurate results, the apparatus was adjusted to 1.3 minutes for a complete cycle of operation from placing the sample in the furnace to the time in which complete oxidation of the sample had taken place and the last of the carbon dioxide containing gas therefrom had passed the thermistor. A flow meter can be provided, if desired, at the discharge end of the conduit 13 to aid in maintaining a constant rate of flow of gas through the conduit.

The following Table 1 illustrates the accuracy of the method and apparatus of this invention and the reproducibility of the results which are obtained when compared with the carbon contents of samples determined by approved and accepted methods. The apparatus was located adjacent to an open hearth furnace where it was exposed to the vibration and the fumes normally associated with the operation of such a furnace and was operated under the conditions described above. In each instance, the total time elapsed between receiving the sample and reporting the carbon analysis was 1.3 minutes.

*Table 1*

| N.B.S. Standard, Percent Carbon | Percent Carbon as Determined by the Present Method | | |
|---|---|---|---|
| | Test I | Test II | Test III |
| 0.011 | 0.011 | 0.011 | 0.011 |
| 0.051 | 0.051 | 0.051 | 0.051 |
| 0.193 | 0.193 | 0.195 | 0.193 |
| 0.409 | 0.412 | 0.409 | 0.409 |
| 0.629 | 0.629 | 0.629 | 0.626 |
| 1.01 | 1.01 | 1.01 | 1.00 |

In another series of tests, pin samples were analyzed for carbon by the conventional "carbometer" method and by the present method. The results are set out in Table 2.

*Table 2*

| Example No. | Percent Carbon by Carbometer | Percent Carbon by Present Method | | |
|---|---|---|---|---|
| | | Test I | Test II | Test III |
| 1 | .30 | .305 | .30 | .30 |
| 2 | .24 | .19 | .19 | .19 |
| 3 | .68 | .68 | .675 | .68 |
| 4 | .12 | .12 | .12 | .12 |

It will be noted from the above results that the carbon analysis obtained by the thermal conductivity method of this invention is extremely accurate and reproducible when compared with analyses conducted on the same substances by the United States National Bureau of Standards. They also show, Table 2, that the accepted carbometer method of analyses, while reproducible, is not necessarily accurate in that it depends on the history of sample beyond the control of the operator and the absence of errors in manipulation.

In the determination of both the sulphur and carbon contents of steel, it merely is necessary to monitor the gas stream which contains both these elements as volatile oxides, pass the gas stream after the monitoring step through a sulphur dioxide absorber and then pass it through a second monitoring step. The first reading is the total carbon plus sulphur and the second reading is the carbon content. By subtracting the second reading from the first, the sulphur content is obtained.

The method and apparatus of this invention has a number of important advantages. It is very accurate. It is inexpensive to install and operate. It can be located adjacent to the point at which the analyses are required regardless of the vibration and fume conditions to which it may be subjected. It can be made completely automatic in operation, other than placing the sample in the furnace, and can be operated by semiskilled personnel.

The method has the further advantage in that it can be employed for the determination of the amounts of elements other than carbon and sulphur which are present in substances other than iron and steel provided that the elements are capable of forming volatile or gaseous oxides. Having discovered the principles on which the present method is based, conventional apparatus is available for detecting and determining the extent to which such elements, in oxide form, are present in the gas stream flowing from the furnace to the detecting and monitoring apparatus.

It will be understood that modifications can be made in the preferred embodiment of the invention described herein without departing from the scope of the invention defined by the appended claims.

What we claim as new and desire to protect by Letters Patent of the United States is:

1. The method of determining the amount of an element capable of forming a volatile or gaseous oxide and present in a substance which contains at least one other element, said method comprising the steps of reacting, in a reaction zone, solid particles of a representative sample of known weight of said substance with oxygen at a temperature at which said element combines with oxygen to form a volatile or gaseous oxide; maintaining a constant pressure of oxygen above atmospheric pressure in said reaction zone, withdrawing a stream of oxygen and contained volatile or gaseous element oxide from said reaction zone, and reducing the pressure of said gas stream to about atmospheric pressure whereby a substantially constant gas stream flow rate is established during oxidation of the sample; translating changes in the thermal conductivity of said gas stream during the flow thereof into electrical impulses; integrating and accumulating said electrical impulses during the flow of said gas stream; and continuing the oxidation of said sample until said element has been removed therefrom and carried past said thermal conductivity translating step.

2. The method of determining the amount of an element capable of forming a volatile or gaseous oxide and present in a substance which contains at least one other element, said method comprising the steps of reacting, in a reaction zone, solid particles of a representative sample of known weight of said substance with oxygen at a temperature at which said element combines with oxygen to form a volatile oxide; maintaining a constant pressure of oxygen above atmospheric pressure in said reaction zone, withdrawing a stream of oxygen and contained volatile or gaseous element oxide from said reaction zone, and reducing the pressure of said gas stream to about atmospheric pressure whereby a constant gas stream flow rate is established; adjusting the temperature of said gas stream to a predetermined temperature; translating the thermal conductivity of said gas stream maintained at a substantially constant flow rate to electrical impulses; continuing said oxidation step until said element has been removed from said sample and carried past said translating step as a volatile or gaseous oxide; and integrating, totalling and recording said electrical impulses during the flow of said gas stream.

3. The method of determining the amount of an element selected from the group consisting of carbon and sulphur contained in a ferrous metal or metal alloy which comprises the steps of reacting, in a reaction zone, solid particles of a representative sample of known weight of said substance with oxygen at a temperature at which said element combines with oxygen to form a gaseous oxide; maintaining a constant pressure of oxygen above atmospheric pressure in said reaction zone, withdrawing a stream of oxygen and contained gaseous element oxide from said reaction zone, and reducing the pressure of said gas stream to about atmospheric pressure whereby the flow of gas stream is maintained at a substantially uniform rate during the oxidation of said sample; translating changes in the thermal conductivity of said gas stream during the flow thereof into electrical impulses; integrating and accumulating said electrical impulses during the flow of said gas stream; and continuing the oxidation of said sample until said element has been removed therefrom and carried past said thermal conductivity translating step.

4. Apparatus for determining the amount of at least one element which is present in a substance with at least one other element and which is capable of forming a volatile or gaseous oxide which comprises a heatable container adapted to receive a sample of the substance; means for supplying oxygen to said container; means for heating said sample in said container to a temperature at which said element combines with oxygen to form a volatile or gaseous oxide; means for maintaining a constant pressure of oxygen above atmospheric pressure in said container; conduit means connected to said container and to means for monitoring changes in the thermal conductivity of said gas stream; means in said conduit for reducing the pressure of the gas stream flowing from said container whereby a constant rate of flow of said gas stream past said monitoring means is maintained; and means connected to said thermal conductivity monitoring means for accumulating a signal produced by variations in the thermal conductivity of the flowing stream of gas.

5. Apparatus for determining the amount of an element which is present in a substance with at least one other element and which is capable of forming a volatile or gaseous oxide which comprises a heatable container adapted to receive a sample of the substance; means for supplying oxygen to said container at a substantially uniform pressure above atmospheric pressure; means for heating said sample in said container to a temperature at which said element combines with oxygen to form a volatile or gaseous oxide; conduit means connected to said container and to means for monitoring changes in thermal conductivity of said gas stream; means in said conduit for separating solid particles from said gas stream;

means in said conduit adapted to reduce the pressure of the gas stream flowing from said container for maintaining a constant rate of flow of said gas stream past said monitoring means; heat exchange means in the path of flow of said gas stream for adjusting the temperature of said gas stream to a predetermined temperature; and means connected to said thermal conductivity monitoring means for accumulating a signal produced by variations in the thermal conductivity of the flowing stream of gas.

6. The method of determining the amount of an element capable of forming a volatile or gaseous oxide and present in a substance which contains at least one other element, said method comprising the steps of reacting, in a reaction zone, solid particles of a representative sample of known weight of said substance with oxygen at a temperature at which said element combines with oxygen to form a volatile or gaseous oxide; maintaining a constant pressure of oxygen above atmospheric pressure in said reaction zone, withdrawing a stream of oxygen and contained volatile or gaseous element oxide from said reaction zone, and reducing the pressure of said gas stream to about atmospheric pressure whereby a constant gas stream flow rate is established; separating solid particles from said gas stream; adjusting the temperature of said gas stream to a predetermined temperature; translating changes in the thermal conductivity of said gas stream during the flow thereof into electrical impulses; integrating and accumulating said electrical impulses during the flow of said gas stream; and continuing the oxidation of said sample until said element has been removed therefrom and carried past said thermal conductivity translating step.

7. The method of determining the amount of an element selected from the group consisting of carbon and sulphur contained in a ferrous metal or metal alloy which comprises the steps of reacting, in a reaction zone, solid particles of a representative sample of known weight of said substance with oxygen at a temperature at which said element combines with oxygen to form a gaseous oxide; maintaining a constant pressure of oxygen above atmospheric pressure in said reaction zone, withdrawing a stream of oxygen and contained gaseous element oxide from said reaction zone, and reducing the pressure of said gas stream to about atmospheric pressure whereby a constant rate of flow of gas stream is established; adjusting the temperature of said gas stream to a predetermined temperature; translating changes in the thermal conductivity of said gas stream during the flow thereof into electrical impulses; integrating and accumulating said electrical impulses during the flow of said gas stream; and continuing the oxidation of said sample until said element has been removed therefrom and carried past said thermal conductivity translating step.

References Cited by the Examiner
UNITED STATES PATENTS

| | | | |
|---|---|---|---|
| 2,753,246 | 7/56 | Shields et al. | 23—253 |
| 2,905,536 | 9/59 | Emmet et al. | 23—232 |
| 2,962,360 | 5/60 | Bennet et al. | 23—254 |

MORRIS O. WOLK, *Primary Examiner.*

JAMES H. TAYMAN, Jr., *Examiner.*